May 24, 1932.  G. R. CUNNINGTON  1,859,657

NONSKID LINK AND MANUFACTURE THEREOF

Filed Feb. 11, 1930

INVENTOR.
George R. Cunnington
BY
Fay, Oberlin & Fay
ATTORNEYS

Patented May 24, 1932

1,859,657

UNITED STATES PATENT OFFICE

GEORGE R. CUNNINGTON, OF AKRON, OHIO, ASSIGNOR, BY MESNE ASSIGNMENTS, TO THE GENERAL TIRE & RUBBER COMPANY, OF AKRON, OHIO, A CORPORATION OF OHIO

NONSKID LINK AND MANUFACTURE THEREOF

Application filed February 11, 1930. Serial No. 427,615.

This invention relates to non-skid links for vehicle tire chains, and more particularly to improved links of the general type shown in my copending applications Serial Nos. 222,240 and 290,894, filed September 27, 1927 and July 7, 1928, respectively the present application being a continuation, in part of both of the aforesaid applications.

One of the objects of the present invention is to provide flexible non-skid links having reinforcing means embedded therein with improved means for securing terminal hooks thereto.

Another object is to provide a non-skid link having an embedded reinforcing member therein with means for centering the terminal hooks with respect to the reinforcing member.

Another object is to provide a reinforced non-skid link of an improved type wherein greater flexibility is provided at the center than near the ends thereof.

A further object is to provide a non-skid link having embedded expanded wire reinforcing elements therein extending from the ends toward the center thereof, with effective means for resiliently connecting the innermost ends and for holding the wire elements at such ends against displacement.

With the above and other objects in view which will be apparent from the detailed description to follow, this invention consists in certain novel features of construction and combinations of parts which will be readily understood by those skilled in the art to which the invention appertains.

In the accompanying drawings which illustrate suitable embodiments of the present invention:—

Figure 1:
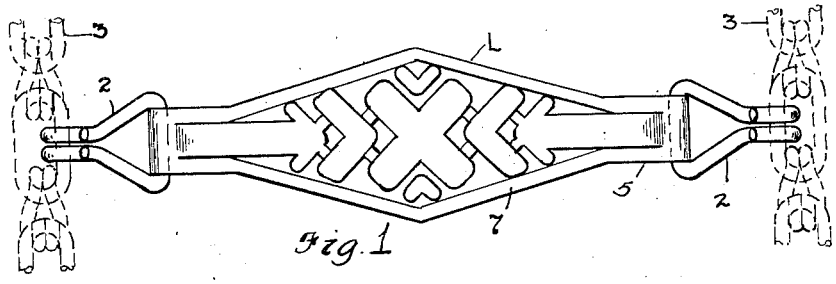
Figure 2:
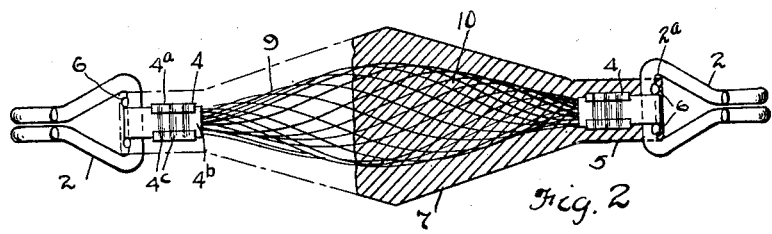
Figure 3:
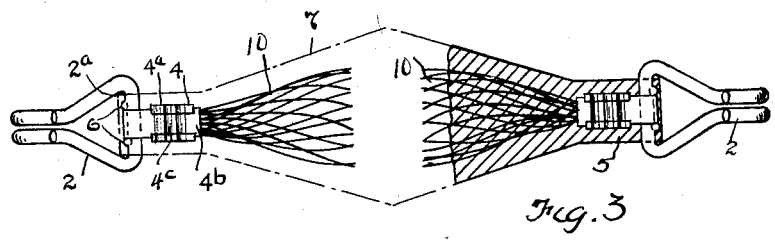
Figure 4:
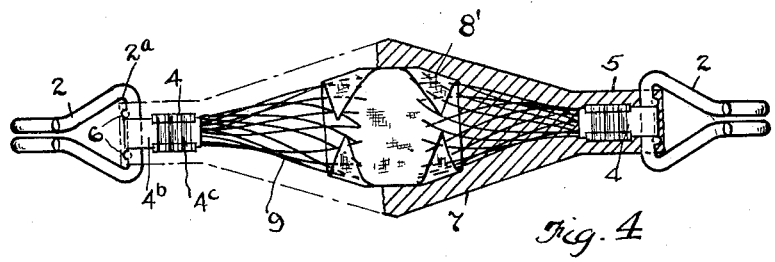
Figure 5:
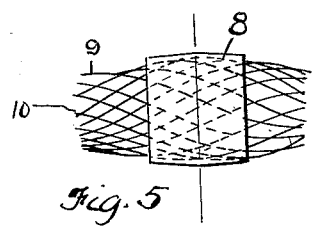
Figure 6:
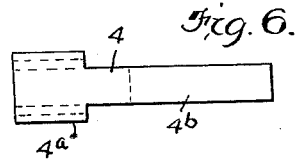

Fig. 1 is a plan view of a non-skid link constructed in accordance with the present invention; Fig. 2 is a plan view of the link, portions of the rubber covering being broken away and shown in section to illustrate the reinforcement thereof; Fig. 3 is a view similar to Fig. 2 in which the reinforcement is split at the center and the ends thereof being spaced apart; Fig. 4 is a view similar to Fig. 3, showing a fabric connecting means extending between the spaced ends of the reinforcement thereof; Fig. 5 is a fragmentary plan view of the central portion of the reinforcing member, showing suitable fabric wrapped around the same; and Fig. 6 is a plan view of the blank from which the terminal securing clip is formed.

Referring to the accompanying drawings in which like numerals refer to like parts throughout the several views, the non-skid link L is of substantially a diamond shape to provide a widened central portion, and has end portions 5 of relatively narrow cross section. The cross links in use are attached at their ends to suitable side members such as the chains 3 shown in broken outline by means of suitable terminals such as hook plates 2. As shown in the various views, the rubber body 7 of the link L extends from terminal to terminal and substantially surrounds the transverse portions of the terminal.

The terminals 2 are interconnected by a metallic reinforcing member 9 embedded in the rubber covering of the non-skid link L. This reinforcement 9, as described in my previously mentioned copending applications, is formed from a flat strip or blank composed of a plurality of interlaced longitudinally extending wire elements 10.

In the formation of the strip 9 to the shape shown in Fig. 2, the ends of the same are clamped to hold the wire elements 10 against separation, and the ends are then moved toward each other while holding the strip against buckling to shorten the strip. During the shortening of the strip, the wire elements 10 distort and move outwardly in such a manner that the edges converge from the clamped ends toward a central transverse plane. This lateral expansion of the blank provides a plurality of interstices between the wire elements 10, through which the rubber body portion 7 of the link extends when it is molded to shape.

The terminals 2 are rigidly secured to each end of the reinforcement 9 before it is expanded to shape by means of suitable clips 4 formed from a single piece of sheet metal. The blank from which each clip 4 is formed is of a substantially T shape, as shown in Fig. 6. The leg or tongue portion 4b of the clip is extended through the terminal hook 2 and then folded back upon itself. The closely associated wires of the reinforcement blank are positioned between the bent-back tongue 4b and the body portion of the clip, and then the projecting sides 4a of the body portion are securely clinched over the edges of the bent-back tongue 4b to securely clamp the massed wires at the end of the reinforcing element 9 together.

If desired, the ends of the reinforcing element may be further clamped by cross crimping the clip 4, as shown at 4c in Figs. 2 to 4. It is thus seen that the assemblage is firmly bound together, while permitting a limited hinge movement of the terminal 2.

Since the rubber body 7 of the link completely envelopes the reinforcement 9 to protect it against deleterious exposure, it is desirable to provide a means for positively centering the terminal 2 with respect to the reinforcing element 9, so as to obviate wearing down of the end edges of the rubber covering by the action of the terminal cheeks 2a against the same.

Small projections 6 are preferably struck up on the transversely extending portion of the terminal and are so spaced as to accommodate the tongue 4b of the clip 4 therebetween. These projections 6 obviously center the terminals with respect to the reinforcement 9 and the rubber covering and insure against lateral chafing and wear.

The reinforcing element 9 need not necessarily extend entirely across the link in all cases and may only extend from each terminal 2 toward the center thereof. Referring to Fig. 3, the same general type of reinforcement 9, that is, the expanded braided wire, as that shown in Fig. 2 is employed. In this construction, however, the reinforcement 9 is severed through the central portion thereof, and the severed ends are spaced a substantial distance apart at the central zone of the link. The reason for severing the reinforcement in this manner is to provide a zone of greater flexibility at the central portion of the link which permits the tire chain having a plurality of cross links of the type described assembled thereto to be put on a vehicle tire. Since the central portion of the link contacts with both the tire and the ground, it is apparent that no appreciable amount of lateral stretching action is exerted on the link.

It is desirable, however, in the construction shown in Fig. 3, to prevent a further separation or expansion of the severed ends of the reinforcing member 9. This is preferably accomplished by providing a connecting member 8' of suitable rubberized fabric, the corners of which are folded over to engage the wire elements. The connecting member 8' is applied after the member 9 has been severed. As shown in Fig. 4, the rubberized fabric 8' bridges the space between the severed ends of the reinforcing element and is so wrapped therearound that the wire elements 10 will be held against further separation when the rubber body 7 is molded around the same and vulcanized.

In some instances it may be desirable to wrap the severed ends of the reinforcing member without connecting the same, as shown in Fig. 4. One satisfactory method of doing this is to wrap the reinforcing member 9 with a strip 8 of suitable fabric, as shown in Fig. 5, and to then sever the member 9 and fabric in a single operation along the transversely extending broken line indicated.

It is to be particularly noted that the present invention provides an economical and very effective means for securing terminal hooks to reinforcing elements of the class described.

Furthermore, it is apparent that a satisfactory means is provided for preventing separation of the severed ends of the reinforcing element during the molding of the rubber body around the same.

Aside from the specific embodiments of the invention herein shown and described, it will be understood that numerous details of construction may be altered or omitted without departing from the spirit and scope of this invention, and it is not the desire to limit the invention to the exact construction herein set forth, as it is desired to claim the invention broadly as well as specifically as indicated in the appended claims.

Other modes of applying the principle of the invention may be employed, change being made as regards the details disclosed, provided the elements or steps stated in any of the following claims, or the equivalent of such, be employed.

I therefore particularly point out and distinctly claim as my invention:—

1. A non-skid link, comprising a body of flexible rubber, metal reinforcement means in said body, and terminals for the reinforcement means, said reinforcement means extending from each terminal in independent sets toward the middle of said body of rubber.

2. A non-skid link, comprising a body of flexible rubber, metal reinforcement means in said body, terminals for the reinforcement means, and shoulders for positioning the reinforcement means with respect to the terminal, said reinforcement means extending from each terminal in independent sets toward the middle of said body of rubber.

3. A non-skid link, comprising a body of flexible rubber, metal reinforcement means, and terminals for the reinforcement means, said reinforcement means diverging in independent sets of flexible wires from each terminal toward the middle of said body of rubber.

4. A non-skid link, comprising a body of flexible rubber, metal reinforcement means comprising a plurality of elements having free ends adjacent the ends of the body, terminals for the reinforcement means, and guard material interposed between the rubber and the free ends of said reinforcement means.

5. A non-skid link, comprising a body of flexible rubber, metal reinforcement means in said body, terminals for the reinforcement means, said reinforcement means diverging from each terminal in independent sets of flexible wires extending toward the middle, and guard material interposed between the rubber and the free ends of said wires.

6. A non-skid link, comprising a body of flexible rubber, metal reinforcement means in said body, terminals for the reinforcement means, said reinforcement means diverging from each terminal in independent sets of flexible wires extending toward the middle of said body of rubber, and fabric material guarding the ends of said wires in the rubber.

7. A non-skid link comprising a flexible rubber body, reinforcing means embedded in said body comprising a pair of braided wire members spaced apart at the center of said link, the wires of each member being securely held together at the end of said link and being divergently expanded toward the center of said link, a terminal at each end of said link, and means for securing said terminal to the end of the adjacent braided wire member.

8. A non-skid link comprising a flexible rubber body, reinforcing means embedded in said body comprising a pair of braided wire members spaced apart at the center of said link, the wires of each member being securely held together at the end of said link and being divergently expanded toward the center of said link, flexible connecting means folded around the expanded ends of said reinforcing members to hold the wires thereof at said ends in separated expanded relationship, a terminal at each end of said link, and means for securing said terminal to the end of the adjacent braided wire member.

9. In a non-skid link having an expanded substantially diamond-shaped reinforcement of braided wire and terminals at each end thereof, means for securing said terminals to the none-expanded ends of said reinforcement comprising a strap member surrounding the end of said reinforcement, an integral tongue on said strap member extending through said terminal and being folded back to rest on said end of said reinforcement, and integral side portions on said strap member clinched against said folded back tongue to rigidly clamp said reinforcement end in position.

10. A tire cross link comprising reinforcing means formed of wire strands which are grouped together adjacent the ends of the link and diverge laterally from the ends of the link toward the mid portion thereof, a clamping member secured to the reinforcing means at each end of the link, a terminal member hingedly secured to each of said clamping members and carrying means for centering such clamping members thereon, and a body of rubber substantially completely enclosing said reinforcing means and the clamping members.

11. A tire cross link comprising reinforcing means formed of wire strands which are grouped together adjacent the ends of the link and diverge laterally from the ends of the link toward the mid portion thereof, a clamping member folded and crimped to the reinforcing means at each end of the link, a terminal member hingedly secured to each of said clamping members, and a body of rubber substantially completely enclosing said reinforcing means and the clamping members.

12. A tire cross link comprising reinforcing means consisting of strands grouped together at the ends of the link and diverging laterally therefrom inwardly of the ends of the link and forming a plurality of interstices of increasing width, and terminating in the central portion of the link in spaced relation to each other, a spacing member connecting the inner extremities of said reinforcing means, connecting means permanently secured to the grouped strands of the reinforcing means at each end of the link, terminal means carried by each of said connecting means, and a body of rubber substantially completely enclosing the structure between said terminal means.

13. A tire cross link comprising reinforcing means consisting of strands grouped together at the ends of the link and diverging laterally therefrom inwardly of the ends of the link and forming a plurality of interstices of increasing width, and terminating in the central portion of the link in spaced relation to each other, a spacing member connecting the inner extremities of said reinforcing means, and consisting of a fabric material overlying the inner extremities of said reinforcing means, connecting means permanently secured to the grouped strands of the reinforcing means at each end of the link, terminal means carried by each of said connecting means, and a body of rubber substantially completely enclosing the structure between said terminal means.

14. In or for a vehicle tire chain, a non-skid link comprising a body of flexible rubber, a braided wire entirely within the rubber and progressively expanded in width from the ends toward the center of the link.

15. In or for a vehicle tire chain, a non-skid link comprising a body of flexible rubber wider centrally, and flexible reinforced braided wire expanded centrally in generally corresponding shape.

16. In or for a vehicle tire chain, a non-skid link comprising a body of flexible rubber wider at the center thereof, and a braided wire reinforcing strip extending longitudinally through said body and expanded centrally, the wires of said strip diagonal-wise in said wider central portion.

17. A tire cross link comprising a reinforcing member consisting of a plurality of strands bunched at the ends of the link and diverging from the ends toward the center thereof, said strands extending in crossing relation to provide interstices of increasing size inwardly of the ends of the link, terminal members permanently carried by said reinforcing member at the end of the link, and a body of rubber substantially completely enclosing the reinforcing member.

18. A tire cross link comprising a body of flexible rubber and a wire mesh reinforcement extending substantially throughout the length of the link within the body of rubber, said wire mesh reinforcement being expanded laterally to greater width in the central portion of said link.

Signed by me this 6th day of February, 1930.

GEORGE R. CUNNINGTON.